(12) United States Patent
Liu et al.

(10) Patent No.: US 12,247,895 B1
(45) Date of Patent: Mar. 11, 2025

(54) METHOD FOR PREDICTING DUMMY HEAD INJURY DURING AUTOMOBILE COLLISION

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

(72) Inventors: Weidong Liu, Tianjin (CN); Zhixin Liu, Tianjin (CN); Yongqiang Wu, Tianjin (CN); Tianyi Hao, Tianjin (CN); Haitao Zhu, Tianjin (CN); Kai Wang, Tianjin (CN); Peng Liu, Tianjin (CN); Hongyang Qi, Tianjin (CN); Weixiao Li, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/797,932

(22) Filed: Aug. 8, 2024

(30) Foreign Application Priority Data

Oct. 30, 2023 (CN) .......................... 202311411549.5

(51) Int. Cl.
*G01L 5/00* (2006.01)
*G01M 17/007* (2006.01)
(Continued)

(52) U.S. Cl.
CPC ......... *G01L 5/0052* (2013.01); *G01M 17/007* (2013.01); *G06F 17/10* (2013.01); *G09B 23/30* (2013.01)

(58) Field of Classification Search
CPC .... G01L 5/0052; G01M 17/007; G06F 17/10; G09B 23/30
See application file for complete search history.

(56) References Cited

FOREIGN PATENT DOCUMENTS

| CN | 106872180 A | 6/2017 |
| CN | 114323529 A | 4/2022 |

(Continued)

OTHER PUBLICATIONS

Ray, M. H., & Hiranmayee, K. (2000). Evaluating Human Risk in Side Impact Collisions with Roadside Objects. Transportation Research Record, 1720(1), 67-71. https://doi.org/10.3141/1720-08 (Year: 2000).*

(Continued)

*Primary Examiner* — Eric S. McCall
*Assistant Examiner* — Timothy P Graves
(74) *Attorney, Agent, or Firm* — Westbridge IP LLC

(57) ABSTRACT

A method for predicting dummy head injury during an automobile collision includes: enabling a dummy head to collide with a rigid flat plate; obtaining a first data set in a collision process; calculating the maximum contact force of the dummy head and the rigid flat plate in the collision process according to the first data set; dividing a duration of the collision process into a plurality of time intervals; and calculating an injury value of the dummy head in each time interval according to the maximum contact force, and selecting the maximum injury value as a target injury value. The method provided by the present application may realize prediction for the head injury under different scene working conditions, and has the advantages of being simple in test flow, and high in prediction precision.

8 Claims, 2 Drawing Sheets

(51) Int. Cl.
   *G06F 17/10* (2006.01)
   *G09B 23/30* (2006.01)

(56) References Cited

FOREIGN PATENT DOCUMENTS

| | | |
|---|---|---|
| CN | 114910094 A | 8/2022 |
| CN | 115575141 A | 1/2023 |
| CN | 115597813 A | 1/2023 |
| CN | 116067675 A | 5/2023 |
| JP | H08240509 A | 9/1996 |
| JP | 2008216224 A | 9/2008 |

OTHER PUBLICATIONS

First Office Action issued in counterpart Chinese Patent Application No. 202311411549.5, dated Dec. 11, 2023.
Notification to Grant Patent Right for Invention issued in counterpart Chinese Patent Application No. 202311411549.5, dated Jan. 16, 2024.
Second Office Action issued in counterpart Chinese Patent Application No. 202311411549.5, dated Jan. 4, 2024.
Zhang et al., Head Movement and Damage of Dummy in Different Forms of Frontal Crash, Tractor & Farm Transporter, vol. 37, No. 5, pp. 44-46, dated Oct. 15, 2010.

* cited by examiner

METHOD FOR PREDICTING DUMMY HEAD INJURY DURING AUTOMOBILE COLLISION

CROSS-REFERENCE TO RELATED APPLICATIONS

This application claims priority to Chinese Patent Application No. 202311411549.5, filed on Oct. 30, 2023, the content of which is incorporated herein by reference in its entirety.

TECHNICAL FIELD

The present application generally relates to the technical field of safety tests for automobiles, and specifically relates to a method for predicting dummy head injury during an automobile collision.

BACKGROUND

With the increasing number of automobiles in China at present, the safety of automobiles is increasingly valued by consumers, a present method for testing the safety performance of the automobiles in a development process for the automobiles is mainly carried out through an automobile collision test, and in consideration of a high danger in the automobile collision test, an automobile collision dummy becomes a basic tool for the automobile collision test and replaces a real person for the test, so that simulation for the condition of the real person in a real collision process is realized, and the automobile collision dummy plays a crucial role in the development of automobile safety.

Prediction for head injury contributes to guiding improvement for the safety performance of the automobiles, a present method for researching the head injury includes a cadaver test or a volunteer test, with regard to the cadaver test, a cadaver sample is difficult to obtain and the test is difficult to carry out, and with regard to the volunteer test, a large limitation exists, and due to a tolerance limit of a human body, the test at a medium-high speed cannot be carried out. On the basis of the limitations of the above two methods, at present, a finite element method is gradually adopted for simulation to research the head injury, and although a finite element model may carefully evaluate the injury due to a head collision, as many test parameters as possible need to be obtained to increase the calculation accuracy, and due to the large number and the inconvenient obtaining manner of the test parameters, the problem of low efficiency of predicting the head injury exists.

SUMMARY

In view of the above defects or shortages in the prior art, it is expected to provide a method for predicting dummy head injury during an automobile collision to solve the above problems.

The present application provides a method for predicting dummy head injury during an automobile collision, and the method includes the following steps:
  enabling a dummy head to collide with a rigid flat plate, wherein the dummy head is a hollow spherical shell body;
  obtaining a first data set in a collision process, wherein the first data set at least comprises: a mass, radius, a shell body thickness and a pre-collision speed of the dummy head, as well as a mass and a pre-collision speed of the rigid flat plate; and the pre-collision speeds are speeds when the dummy head just makes contact with the rigid flat plate;
  calculating the maximum contact force of the dummy head and the rigid flat plate in the collision process according to the first data set;
  dividing a duration of the collision process into a plurality of time intervals; and
  calculating an injury value of the dummy head in each time interval according to the maximum contact force, and selecting the maximum injury value as a target injury value, where the target injury value is used for representing an injury degree of the dummy head in the collision process.

According to the technical solution provided by the present application, the following steps are further included after the calculating an injury value of the dummy head in each time interval according to the maximum contact force, and selecting the maximum injury value as a target injury value:
  calling an injury level database, and judging an injury level to the dummy head according to the target injury value; the injury level database comprises a plurality of injury level ranges, and the injury level corresponding to each of the injury level ranges.

According to the technical solution provided by the present application, the calculating the maximum contact force of the dummy head and the rigid flat plate in the collision process according to the first data set includes the following steps:
  calculating a post-collision speed of the dummy head and a post-collision speed of the rigid flat plate according to the kinetic energy theorem and the first data set; the post-collision speeds are speeds at the end moment of the collision between the dummy head and the rigid flat plate; and
  calculating the maximum contact force $F_{max}$ of the dummy head and the rigid flat plate in the collision process in combination with the law of energy conservation and according to the first data set, the post-collision speed of the dummy head and the post-collision speed of the rigid flat plate.

According to the technical solution provided by the present application, the post-collision speed of the dummy head is calculated according to the following formula:

$$v'_1 = v_1 + \frac{\int F(t)dt}{m_1} \qquad \text{formula (2)}$$

where $v_1$ represents the pre-collision speed of the dummy head, $v'_1$ represents the post-collision speed of the dummy head, $m_1$ represents the mass of the dummy head, F(t) represents an impact force related to the time, and the change of the impact force meets a change trend of increasing first and then decreasing in the sine curve.

According to the technical solution provided by the present application, total energy of the dummy head and the rigid flat plate before the start of the collision process and after the end of the collision process meets that: total kinetic energy before the start of the collision is equal to the sum of total kinetic energy after the end of the collision, energy lost due to Hertz contact, energy lost due to a shell body deformation, and energy lost due to the collision speeds.

According to the technical solution provided by the present application, while calculating the maximum contact force $F_{max}$ of the dummy head and the rigid flat plate in the collision process in combination with the law of energy conservation and according to the first data set, the post-collision speed of the dummy head and the post-collision speed of the rigid flat plate, the maximum force borne in the Hertz contact and the maximum force borne in the shell body deformation are both equivalent to the maximum contact force $F_{max}$ borne in the collision process.

According to the technical solution provided by the present application, the target injury value is represented by the following formula:

$$HIC = \max(t_1, t_2) \left\{ \frac{1}{(t_2 - t_1)^{3/2}} \left[ \int_{t_1}^{t_2} \frac{F_{max}}{m_1} \sin\left(\pi \frac{t}{T_p}\right) dt \right]^{5/2} \right\} \quad \text{formula (23)}$$

wherein HIC represents the target injury value, $(t_1, t_2)$ represents the time interval, $t_1$ and $t_2$ represent two endpoint moments of the time interval respectively, max $(t_1, t_2)$ represents that the time interval from $t_1$ to $t_2$ is selected to maximize the expression in the parentheses, $m_1$ represents the mass of the dummy head, and $T_p$ represents the duration of the collision process.

According to the technical solution provided by the present application, the energy lost due to the Hertz contact is calculated according to the following formula:

$$E_H = \frac{2}{5} k_H \cdot \Delta x_H^{\frac{5}{2}} \quad \text{formula (10)}$$

wherein $E_H$ represents the energy lost due to the Hertz contact, $\Delta x_H$ represents the sum of deformation quantities of the dummy head and the rigid flat plate in Hertz contact in the collision process, and $k_H$ represents Hertz contact stiffness.

According to the technical solution provided by the present application, the energy lost due to the shell body deformation is calculated according to the following formula:

$$E_{sh} = \frac{1}{2} k_{sh} \cdot \Delta x_{sh}^2 \quad \text{formula (13)}$$

wherein $E_{sh}$ represents the energy lost due to the shell body deformation, $\Delta x_{sh}$ represents a deformation quantity of a bending deformation of the dummy head, and $k_{sh}$ represents contact stiffness of the shell body deformation of the dummy head.

According to the technical solution provided by the present application, the energy lost due to the collision speeds is calculated according to the following formula:

$$E_e = \frac{1 - e^2}{2} \cdot \frac{m_1 m_2}{m_1 + m_2} (v_1 - v_2)^2 \quad \text{formula (15)}$$

wherein $E_e$ represents the energy lost due to the collision speeds, e represents a recovery coefficient, and $m_2$ represents the mass of the rigid flat plate.

Compared with prior art, the beneficial effects of the present application are as follows: according to the present application, the first data set is obtained, and the maximum contact force of the dummy head and the rigid flat plate in the collision process may be calculated according to the first data set; the duration of the collision process is divided into a plurality of time intervals, and the target injury value of the dummy head in each time interval is calculated according to the maximum contact force, so that the accuracy of calculating the target injury value is ensured, and the maximum injury value is taken as the target injury value for guiding improvement for the safety function of the automobile through a comparison; and prediction for the head injury under different working conditions may be realized through giving different collision speeds to the dummy head and the rigid flat plate. According to the method provided by the present application, a large number of test parameters that are difficult to obtain do not need to be obtained, so that the test time is saved; and the maximum contact force of the dummy head and the rigid flat plate in the collision process may be accurately calculated through obtaining and calculating some conventional test parameters that are easy to obtain, and the target injury value of the dummy head may be accurately and rapidly calculated according to the maximum contact force, so that the efficiency of predicting the target injury value of the dummy head is increased.

BRIEF DESCRIPTION OF DRAWINGS

Other features, objectives and advantages of the present application will become more apparent by reading the detailed description of non-limiting embodiments made with reference to the following accompanying drawings.

DETAILED DESCRIPTION OF THE EMBODIMENTS

Figure 1:
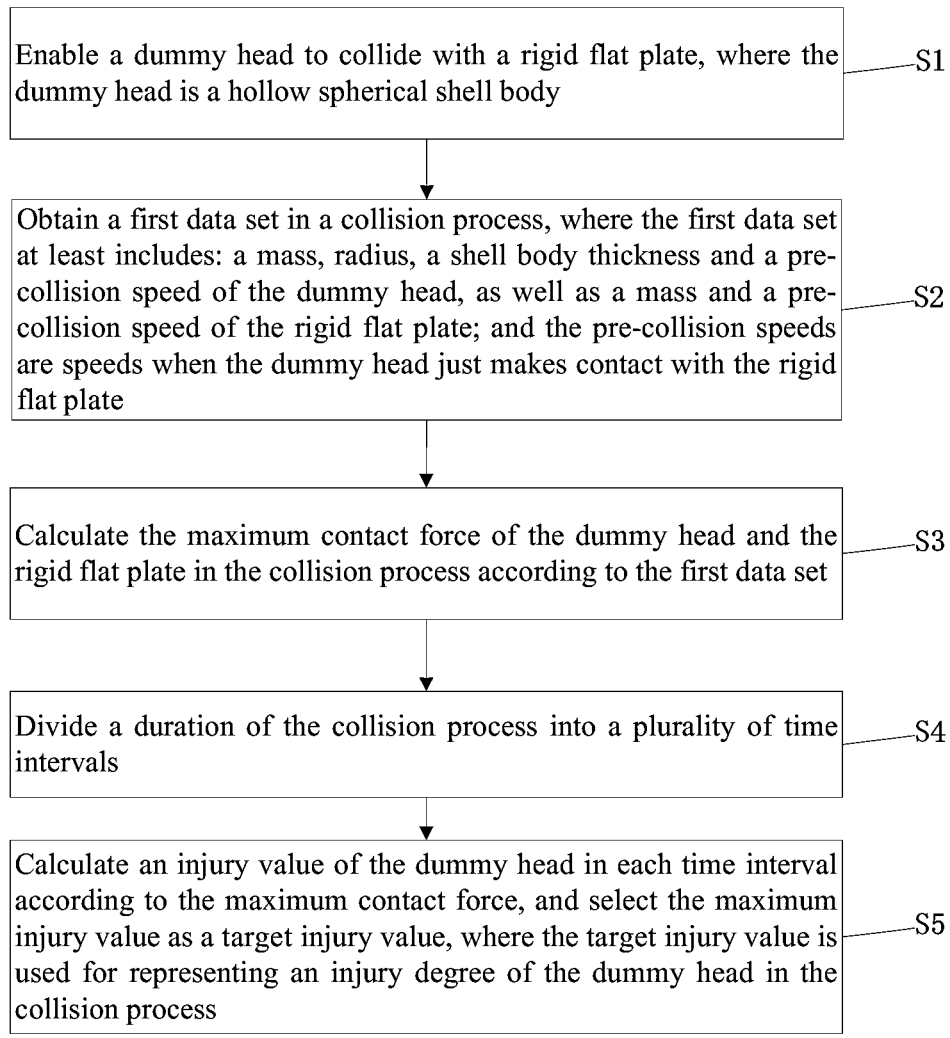
FIG. 1 is a flow diagram of steps of a method for predicting dummy head injury during an automobile collision, which is provided by the present application.
Figure 2:
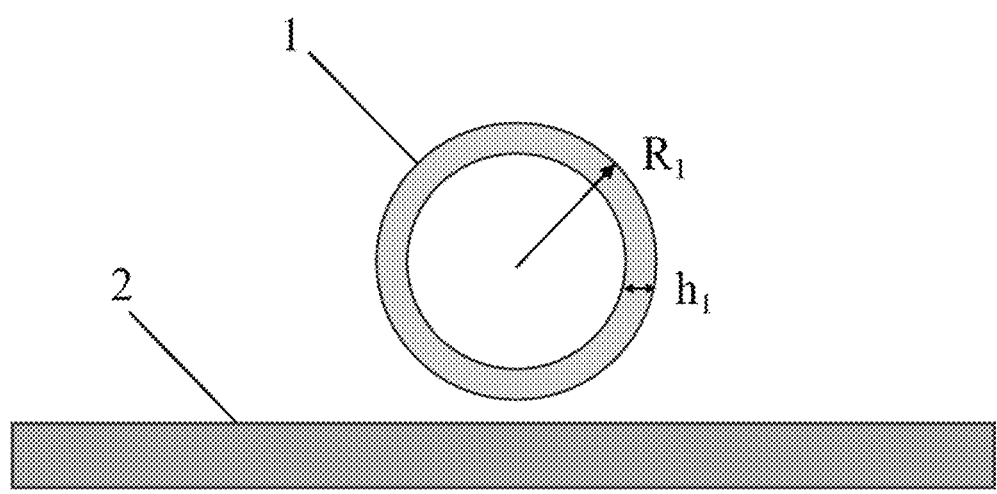
FIG. 2 is a scene diagram of a collision between a dummy head and a rigid flat plate, which is provided by the present application.

The present application is further described in detail below in combination with the drawings and the examples. It may be understood that, the specific examples described here are merely used for explaining the related application, but not to limit the application. In addition, it further needs to be noted that, for the convenience of description, only the parts related to the application are shown in the drawings.

It needs to be noted that, the examples in the present application and the features in the examples may be combined with each other without conflict. The present application will be described below in detail with reference to the drawings and in combination with the examples.

Referring to FIG. 1, the present application provides a method for predicting dummy head injury during an automobile collision, and the method includes the following steps:

S1, enabling a dummy head 1 to collide with a rigid flat plate 2, where the dummy head 1 is a hollow spherical shell body;

S2, obtaining a first data set in a collision process, where the first data set at least includes: a mass, radius, a shell body thickness and a pre-collision speed of the dummy head 1, as well as a mass and a pre-collision speed of the rigid flat plate 2; and the pre-collision speeds are speeds when the dummy head just makes contact with the rigid flat plate;

S3, calculating the maximum contact force of the dummy head 1 and the rigid flat plate 2 in the collision process according to the first data set;

S4, dividing a duration of the collision process into a plurality of time intervals; and S5, calculating an injury value of the dummy head in each time interval according to the maximum contact force, and selecting the maximum injury value as a target injury value, where the target injury value is used for representing an injury degree of the dummy head in the collision process.

Further, the calculating the maximum contact force of the dummy head and the rigid flat plate in the collision process according to the first data set includes the following steps:

calculating a post-collision speed of the dummy head and a post-collision speed of the rigid flat plate according to the kinetic energy theorem and the first data set; the post-collision speeds are speeds at the end moment of the collision between the dummy head and the rigid flat plate; and calculating the maximum contact force $F_{max}$ of the dummy head and the rigid flat plate in the collision process in combination with the law of energy conservation and according to the first data set, the post-collision speed of the dummy head and the post-collision speed of the rigid flat plate.

According to the present application, the dummy head is taken as an object, and an injury condition of the dummy head in the collision process is predicted. A collision model of the dummy head is constructed through simplifying the dummy head into a hollow spherical shell body, meanwhile, in order to better reflect collision characteristics of the dummy head, the shape of the dummy head and the thickness of the shell body are taken into account to form a prediction model for head injury, and the model may realize prediction for a target injury value of a head injury criterion HIC under different working conditions, so that the test cost is reduced, and meanwhile, the calculation cycle is greatly reduced; and the process mainly includes:

simplifying the dummy head into a hollow spherical shell body with a mass of $m_1$, a radius of $R_1$, a shell body thickness of $h_1$, and a pre-collision speed of $v_1$; and a collision object is a rigid flat plate with a mass of $m_2$, a radius of $R_2$, and a pre-collision speed of $v_2$. The rigid flat plate may be made of a glass material or a plastic material here, when the rigid flat plate is made of the glass material, a collision between a human head and a front windshield of an automobile may be simulated; and when the rigid flat plate is made of the plastic material, a collision between the human head and a front center console of the automobile may be simulated.

A conventional collision test used for a collision system for a dummy head and a rigid flat plate is often to give a speed to the dummy head and the rigid flat plate respectively, the dummy head is enabled to collide with the rigid flat plate at the speed, and then a target injury value is obtained. In the present application, for the convenience of carrying out a test, the rigid flat plate is fixed to the ground, the dummy head is lifted and placed above the rigid flat plate, and the dummy head is released and enabled to obtain a pre-collision speed $v_1$ in a manner of free falling; in this case, it is considered that the pre-collision speed $v_2$ of the rigid flat plate is 0; and the pre-collision speed $v_1$ of the dummy head may be obtained through calculation or obtained through a speed detection apparatus. In other examples, a speed may also be provided for the dummy head and the rigid flat plate in other manners, and the other manners of providing a speed will not be elaborated here.

Specific steps of the prediction method provided by the present application are as follows:

firstly, calculating a post-collision speed of the dummy head and a post-collision speed of the rigid flat plate according to the kinetic energy theorem and the first data set; the post-collision speeds are speeds at the end moment of the collision between the dummy head and the rigid flat plate; and the post-collision speed of the dummy head is calculated according to the following formula:

$$\int F(t)dt = m_1(v'_1 - v_1) \qquad \text{formula (1)}$$

a formula (2) is obtained after deduction:

$$v'_1 = v_1 + \frac{\int F(t)dt}{m_1} \qquad \text{formula (2)}$$

where $v'_1$ represents the post-collision speed of the dummy head, and F(t) represents an impact force related to time.

In the collision process, the impact force between the dummy head and the rigid flat plate is gradually increased from 0 when the dummy head makes contact with the rigid flat plate, gradually decreased after the dummy head rebounds, and decreased to 0 until the dummy head is not in contact with the rigid flat plate; and referring to results of many previous tests, according to experience, it is assumed that the impact force is approximately changed with a trend of increasing first and then decreasing in the sine curve, then $\int F(t)dt$ may be calculated through the following formula (3):

$$\int F(t)dt = \int_0^{T_p} F_{max} \sin\left(\pi \frac{t}{T_p}\right) dt \qquad \text{formula (3)}$$

where $F_{max}$ represents the maximum contact force in the collision process, and a specific value of the maximum contact force $F_{max}$ does not need to be known in this step, and is substituted into the formula for calculation; $T_p$ represents the duration of the collision process, that is, starting from the moment when the dummy head makes contact with the rigid flat plate and ending at the moment when the dummy head leaves from the rigid flat plate after rebounding, and an expression of p is shown in a formula (4):

$$T_p = \pi \sqrt{\frac{m^*}{k_{effec}}} \qquad \text{formula (4)}$$

where $k_{effec}$ represents effective linear coupling stiffness of Hertz contact stiffness and bending stiffness of shell body contact, and m* represents an equivalent mass. The dummy head and the rigid flat plate are equivalent to a complete test system here, and the equivalent mass refers to a mass of the test system. m* is calculated through a formula (5):

$$m^* = \frac{m_1 m_2}{m_1 + m_2}; \qquad \text{formula (5)}$$

The rigid flat plate is placed on the ground in the present application, so that the speed $v'_2$ of the rigid flat plate does not be changed by default at the end of the collision, and is still 0.

In a preferred implementation manner, total energy of the dummy head and the rigid flat plate before the start of the collision and after the end of the collision meets that: total kinetic energy before the start of the collision is equal to the sum of total kinetic energy after the end of the collision, energy lost due to Hertz contact, energy lost due to a shell body deformation, and energy lost due to the collision speeds.

Specifically, after the dummy head collides with the rigid flat plate, the total energy at the start moment of the collision process is equal to the total energy at the end moment of the collision process according to the law of energy conservation; the total energy at the start moment of the collision process includes: the total kinetic energy of the dummy head and the rigid flat plate before the collision; and the total energy at the end moment of the collision process includes: the total kinetic energy of the dummy head and the rigid flat plate after the collision, the energy lost due to the Hertz contact, the energy lost due to the shell body deformation, and the energy lost due to the collision speeds.

The main reason why the total energy after the collision is considered here includes not only the total kinetic energy after the collision, but also three parts, that is, the energy lost due to the Hertz contact, the energy lost due to the shell body deformation, and the energy lost due to the collision speeds is to divide the energy after the collision into a plurality of parts, so that the energy composition included after the collision is more specific, consideration for the types of energy losses is more comprehensive, and then the finally-predicted maximum contact force is ensured to be more practical through calculating the losses of a plurality of types of energy.

Calculation methods for the energy lost due to the Hertz contact, the energy lost due to the shell body deformation, and the energy lost due to the collision speeds are as follows:

1. The Energy Lost Due to the Hertz Contact

In the Hertz contact, a relationship between a force borne in the Hertz contact and a deformation caused due to the Hertz contact meets the following formula (6):

$$F_{Hz}=k_H \cdot \Delta x^{3/2}_H \qquad \text{formula (6)}$$

where $F_{Hz}$ represents the maximum force borne in the Hertz contact in the collision process; $\Delta x_H$ represents the sum of the deformation quantities of the dummy head and the rigid flat plate in the Hertz contact in the collision process, and a specific value of $\Delta x_H$ does not need to be known in this step, and is substituted into the formula for calculation; and $k_H$ represents Hertz contact stiffness, and $k_H$ is represented according to a formula (7):

$$k_H = \frac{4}{3} R^{*1/2} \cdot E^* \qquad \text{formula (7)}$$

where R* represents an equivalent radius, E* represents an equivalent elastic modulus; and similarly, the dummy head and the rigid flat plate are equivalent to a complete test system here, the equivalent radius refers to a radius of the test system, and the equivalent elastic modulus refers to an elastic modulus of the test system.

The equivalent radius R* is calculated according to the following formula (8):

$$\frac{1}{R^*} = \frac{1}{R_1} + \frac{1}{R_2} \qquad \text{formula (8)}$$

The equivalent elastic modulus E* meets the following formula (9):

$$\frac{1}{E^*} = \frac{1-\mu_1^2}{E_1} + \frac{1-\mu_2^2}{E_2} \qquad \text{formula (9)}$$

where $E_1$ represents an elastic modulus of the dummy head, $E_2$ represents an elastic modulus of the rigid flat plate, $\mu_1$ represents a Poisson ratio of the dummy head, and $\mu_2$ represents a Poisson ratio of the rigid flat plate; after the material of the dummy head is determined, $E_1$ and $\mu_1$ can be determined; and after the material of the rigid flat plate is determined, $E_2$ and $\mu_2$ can be determined.

Therefore, the energy lost due to the Hertz contact may be obtained through integrating the formula (6), and is calculated according to the following formula (10):

$$E_h = \frac{2}{5} k_H \cdot \Delta x_H^{\frac{5}{2}} \qquad \text{formula (10)}$$

where $E_H$ represents the energy lost due to the Hertz contact.

2. The Energy Lost Due to the Shell Body Deformation

In shell body deformation contact, a relationship between a force borne in a shell body deformation of the dummy head and a bending deformation of the dummy head meets the following formula (11):

$$F_{sh}=k_{sh} \Delta x_{sh} \qquad \text{formula (11)}$$

where $F_{sh}$ represents the maximum force borne in the shell body deformation of the dummy head; sh represents a deformation quantity of the bending deformation of the dummy head, and a specific value of $\Delta x_{sh}$ does not need to be known in this step, and is substituted into the formula for calculation; $k_{sh}$ represents contact stiffness of the shell body deformation of the dummy head, and $k_{sh}$ is represented according to a formula (12):

$$k_{sh}=2.3\times(E_1 \cdot h^2_1)/[R_1(1-\mu^2_1)^{1/2}] \qquad \text{formula (12); and}$$

therefore, the energy lost due to the shell body deformation may be obtained through integrating the formula (11), and is calculated according to the following formula (13):

$$E_{sh} = \frac{1}{2} k_{sh} \cdot \Delta x_{sh}^2 \qquad \text{formula (13)}$$

where $E_{sh}$ represents the energy lost due to the shell body deformation.

3. The Energy Lost Due to the Collision Speeds

A rebounding phenomenon exists after the collision between the dummy head and the rigid flat plate, therefore, a recovery coefficient e is introduced here, the recovery coefficient is a parameter capable of reflecting the capability of the dummy head to recover the deformation in a process of impacting the rigid flat plate, the parameter is only related to the material characteristics of the dummy head and the rigid flat plate, and the recovery coefficient e is represented according to a formula (14):

$$e = \frac{v'_1 - v'_2}{v_1 - v_2};\quad\text{formula (14)}$$

therefore, the energy lost due to the collision speeds may be calculated according to the following formula (15):

$$E_e = \frac{1-e^2}{2} \cdot \frac{m_1 m_2}{m_1 + m_2}(v_1 - v_2)^2 \quad\text{formula (15)}$$

where $E_e$ represents the energy lost due to the collision speeds.

Due to that a relationship between $x_H$ and $F_{Hz}$, as well as a relationship between $\Delta x_{sh}$ and $F_{sh}$ are known, the maximum force $F_{Hz}$ borne in the Hertz contact and the maximum force $F_{sh}$ borne in the shell body deformation contact are both equivalent to the maximum contact force F Max borne in the collision process, an equivalent deformation $\Delta x$ in the collision process may be calculated in combination with the formula (6) and the formula (11), similarly, the dummy head and the rigid flat plate are equivalent to a complete test system here, and the equivalent deformation refers to a deformation of the test system; and the equivalent deformation $\Delta x$ may be represented according to a formula (16):

$$\Delta x = \Delta x_{sh} + \Delta x_H = \frac{F_{max}}{k_{sh}} + \left(\frac{F_{max}}{k_H}\right)^{2/3},\quad\text{formula (16)}$$

then $k_{effec}$ in the formula (4) may be represented as a formula (17):

$$k_{effec} = \frac{F_{max}}{\Delta x};\quad\text{formula (17)}$$

and the following formula (18) is obtained after sorting the formula (17) in combination with the formula (16):

$$k_{effec} = 1/\left(\frac{1}{k_{sh}} + \frac{1}{k_H^{2/3} \cdot F_{max}^{1/3}}\right).\quad\text{formula (18)}$$

In conclusion, according to the law of energy conservation, a relationship between the total energy before the collision and the total energy after the collision is shown in the following formula (19):

$$\frac{1}{2}m_1 v_1^2 + \frac{1}{2}m_2 v_2^2 = E_H + E_{sh} + E_e + E_r \quad\text{formula (19)}$$

where Er represents the total kinetic energy at the end of the collision process, and is represented according to the following formula (20):

$$E_r = \frac{1}{2}m_1 v'^2_1 + \frac{1}{2}m_2 v'^2_2;\quad\text{formula (20)}$$

the following formula (21) is obtained through substituting the formula (10), the formula (13), the formula (15), and the formula (20) into the formula (19):

$$\frac{1}{2}m_1 v_1^2 + \frac{1}{2}m_2 v_2^2 = \frac{2}{5}k_H \Delta x_H^{\frac{5}{2}} + \frac{1}{2}k_{sh}\Delta x_{sh}^2 + \quad\text{formula (21)}$$
$$\frac{1-e^2}{2} \cdot \frac{m_1 m_2}{m_1 + m_2}(v_1 - v_2)^2 + \frac{1}{2}m_1 v'^2_1 + \frac{1}{2}m_2 v'^2_2.$$

an implicit expression of the maximum contact force in the collision process is obtained after sorting the formula (21), and is represented as the following formula (22):

$$4m_1\left(v_1 + \frac{F_{max}T_p}{\pi m_1}\right) + 4m_2\left(\frac{F_{max}T_p}{\pi m_1} - \Delta v\right) - (1-e^2)m^*\Delta v^2 = \quad\text{formula (22)}$$
$$\frac{F_{max}^2}{k_{sh}} + \frac{4F_{max}^{5/3}}{5k_H^{2/3}};$$

the maximum contact force $F_{max}$ in the collision process is obtained through solving the formula (22).

On the basis of the same principle, in another specific implementation manner, the maximum contact force $F_{max}$ may also be calculated in the following manner: before a test is started, elastic modulus $E_1$ and $E_2$, as well as Poisson ratios $\mu_1$ and $\mu_2$ of the dummy head and rigid flat plate are determined according to the materials of the dummy head and rigid flat plate at first; a mass $m_1$, a radius $R_1$, and a shell body thickness k of the dummy head are measured, and meanwhile, a mass $m_2$ and a radius $R_2$ of the rigid flat plate are measured; then a first equation set is obtained through combining the formula (7), the formula (8), and the formula (9), and Hertz contact stiffness $k_H$ is calculated through substituting the known $E_1$, $E_2$, $\mu_1$ and $\mu_2$ into the first equation set; contact stiffness $k_{sh}$ of the shell body deformation of the dummy head is calculated through substituting the known $E_1$, $\mu_1$, $R_1$ and $h_1$ into the formula (12); an equivalent mass $m^*$ is calculated through substituting the known $m_1$ and $m_2$ into the formula (5); and a second equation set is obtained through combining the formula (4) and the formula (18), and an equation related to the maximum contact force $F_{max}$, of the duration $T_p$ of the collision process is calculated through substituting the $m^*$ $k_H$ and $k_{sh}$ into the second equation set. An actual test is started after the above steps are calculated, the dummy head is enabled to collide with the rigid flat plate, and a pre-collision speed $v_1$ of the dummy head, and a pre-collision speed $v_2$ of the rigid flat plate are measured; a third equation set is obtained through combining the formula (2), the formula (3) and the formula (14), and a recovery coefficient e is calculated through substituting the known $v_1$, $v_2$, $m_1$ and $T_p$ into the third equation set; and then the maximum contact force $F_{max}$ in the collision process is calculated through substituting the $m_1$, $m_2$, $m^*$, $v_1$, $v_2$, $k_H$, $k_{sh}$, e and the equation related to the maximum contact force $F_{max}$, of $T_p$ into the formula (22). The characteristic of the specific implementation manner is that: using for parameters that cannot be determined temporarily is avoided in each step, so that the calculation flow is clearer. In practical application, an appropriate calculation method may be selected as needed, and is not specifically limited in the example.

After the maximum contact force $F_{max}$ is obtained, the duration of the whole collision process is divided into a plurality of time intervals, and alternatively, the plurality of time intervals are set at an equal time interval;

In the case of the known maximum contact force $F_{max}$ in the collision process, a target injury value corresponding to each time interval in the collision process may be calculated according to a calculation formula for the target injury value, and the calculation formula for the target injury value is shown as the following formula (23):

$$HIC = \max(t_1, t_2)\left\{\frac{1}{(t_2-t_1)^{3/2}}\left[\int_t^{t_2}\frac{F_{max}}{m_1}\sin\left(\pi\frac{t}{T_p}\right)dt\right]^{5/2}\right\} \quad \text{formula (23)}$$

where HIC represents the target injury value, $(t_1, t_2)$ represents the time interval, $t_1$ and $t_2$ represent two endpoint moments of the time interval respectively, and $\max(t_1, t_2)$ represents that the time interval from $t_1$ to $t_2$ is selected to maximize the expression in the parentheses; and the target injury value may be calculated according to the formula (23) in the case of the known maximum contact force $F_{max}$.

In another implementation manner, in the case of the known maximum contact force $F_{max}$ in the collision process, an acceleration of the dummy head in the collision process may also be calculated according to the maximum contact force $F_{max}$, and is represented by the following formula (24):

$$a(t) = \frac{F_{max}}{m_1}\sin\left(\pi\frac{t}{T_p}\right) \quad \text{formula (24)}$$

where a(t) represents an acceleration related to time.

After the acceleration of the dummy head in the collision process is known, the target injury value in the collision process may also be calculated according to another injury calculation formula, and the another injury calculation formula is shown as the following formula (25); and $$HIC = \max(t_1, t_2)\left\{\frac{1}{(t_2-t_1)^{3/2}}\left[\int_1^{t_2}a(t)dt\right]^{5/2}\right\}; \quad \text{formula (25)}$$

the target injury value may be calculated according to the formula (25) in the case of the known acceleration.

Further, the following steps are further included after the step S5:

calling an injury level database, and judging an injury level to the dummy head according to the target injury value; the injury level database comprises a plurality of injury level ranges, and the injury level corresponding to each of the injury level ranges.

The injury level database is shown in the following Table 1:

TABLE 1

| Injury level database | |
|---|---|
| injury level range | injury level |
| HIC < 650 | level 1 |
| 650 ≤ HIC < 1000 | level 2 |
| 1000 ≤ HIC < 1350 | level 3 |
| 1350 ≤ HIC < 1700 | level 4 |
| HIC ≥ 1700 | level 5 |

Specifically, after the target injury value calculated, which injury level range the target injury value meets is judged through comparing the target injury value with a threshold value corresponding to each injury level range in the injury level database, the corresponding injury level is obtained according to the injury level range that the target injury value meets, and then different degrees of guidance may be provided for improving the safety function of the automobile according to the injury level.

According to the present application, the first data set is obtained, and the speeds of the dummy head and the rigid flat plate at the end moment of the collision process may be calculated according to the momentum theorem and the first data set; the maximum contact force of the dummy head and the rigid flat plate in the collision process may be calculated in combination with the first data set and the speeds of the dummy head and the rigid flat plate at the end moment of the collision process, and according to the law of energy conservation, complex parameters do not need to be obtained in the period, and all parameters that are difficult to obtain and involved in the calculation process for the target injury value may be eliminated through combinations among the different formulas; the target injury value of the dummy head may be rapidly calculated according to the maximum contact force or the acceleration in the collision process of the dummy head and the rigid flat plate, so that the efficiency of calculating the target injury value of the dummy head is increased; the total energy after the collision is divided into the total kinetic energy after the collision, the energy lost due to the Hertz contact, the energy lost due to the shell body deformation, and the energy lost due to the collision speeds, so that consideration for the types of energy losses is more comprehensive, forces borne by the dummy head and the rigid flat plate in the collision process are involved in the energy lost due to the Hertz contact and the energy lost due to the shell body deformation, so that the calculated maximum contact force in the collision process is more accurate, and then the finally-calculated target injury value of the dummy head is more accurate, so that a higher reference value for improving the safety performance of the automobile is achieved.

The above descriptions are merely preferred examples of the present application and explanations for the applied technical principles. Those skilled in the art should understand that, the invention scope referred to in the present application is not limited to the technical solutions formed by specific combinations of the above technical features, but should also cover other technical solutions formed by any combination of the above technical features or equivalent features without departing from the invention concept. For example, technical solutions formed by replacing the above features with (but not limited to) technical features with similar functions and invented in the present application are included.

What is claimed is:

1. A method for predicting dummy head injury during an automobile collision, comprising following steps:
   enabling a dummy head to collide with a rigid flat plate, wherein the dummy head is a hollow spherical shell body;
   obtaining a first data set in a collision process, wherein the first data set at least comprises: a mass, radius, a shell body thickness and a pre-collision speed of the dummy head, as well as a mass and a pre-collision speed of the rigid flat plate; and the pre-collision speeds are speeds when the dummy head just makes contact with the rigid flat plate;
   calculating a maximum contact force of the dummy head and the rigid flat plate in the collision process according to the first data set;
   dividing a duration of the collision process into a plurality of time intervals; and calculating an injury value of the dummy head in each time interval according to the maximum contact force, and selecting the maximum injury value as a target injury value, wherein the target injury value is used for representing an injury degree of the dummy head in the collision process;

wherein the calculating the maximum contact force of the dummy head and the rigid flat plate in the collision process according to the first data set comprises the following steps:

calculating a post-collision speed of the dummy head and a post-collision speed of the rigid flat plate according to the kinetic energy theorem and the first data set; the post-collision speeds are speeds at the end moment of the collision between the dummy head and the rigid flat plate; and calculating the maximum contact force $F_{max}$ of the dummy head and the rigid flat plate in the collision process in combination with the law of energy conservation and according to the first data set, the post-collision speed of the dummy head and the post-collision speed of the rigid flat plate;

wherein the post-collision speed of the dummy head is calculated according to following formula:

$$v'_1 = v_1 + \frac{\int F(t)dt}{m_1} \qquad \text{formula (2)}$$

wherein $v_1$ represents the pre-collision speed of the dummy head, $v'_1$ represents the post-collision speed of the dummy head, $m_1$ represents the mass of the dummy head, F(t) represents an impact force related to the time, and the change of the impact force meets a change trend of increasing first and then decreasing in the sine curve; and the pre-collision speed and the post-collision speed of the rigid flat plate are both 0.

2. The method for predicting the dummy head injury during the automobile collision according to claim 1, further comprising the following steps after calculating an injury value of the dummy head in each time interval according to the maximum contact force, and selecting the maximum injury value as a target injury value:

calling an injury level database, and judging an injury level to the dummy head according to the target injury value; the injury level database comprises a plurality of injury level ranges, and the injury level corresponding to each of the injury level ranges.

3. The method for predicting the dummy head injury during the automobile collision according to claim 2, wherein total energy of the dummy head and the rigid flat plate before the start of the collision process and after the end of the collision process meets that: total kinetic energy before the start of the collision is equal to the sum of total kinetic energy after the end of the collision, energy lost due to Hertz contact, energy lost due to a shell body deformation, and energy lost due to the collision speeds.

4. The method for predicting the dummy head injury during the automobile collision according to claim 3, wherein while calculating the maximum contact force $F_{max}$ of the dummy head and the rigid flat plate in the collision process in combination with the law of energy conservation and according to the first data set, the post-collision speed of the dummy head and the post-collision speed of the rigid flat plate, the maximum force borne in the Hertz contact and the maximum force borne in the shell body deformation are both equivalent to the maximum contact force $F_{max}$ borne in the collision process.

5. The method for predicting the dummy head injury during the automobile collision according to claim 4, wherein the target injury value is represented by the following formula:

$$HIC = \max(t_1, t_2)\left\{\frac{1}{(t_2-t_1)^{3/2}}\left[\int_{t_1}^{t_2} \frac{F_{max}}{m_1}\sin\left(\pi\frac{t}{T_p}\right)dt\right]^{5/2}\right\} \qquad \text{formula (23)}$$

wherein HIC represents the target injury value, $(t_1, t_2)$ represents the time interval, $t_1$ and $t_2$ represent two endpoint moments of the time interval respectively, $\max(t_1, t_2)$ represents that the time interval from $t_1$ to $t_2$ is selected to maximize the expression in the parentheses, $m_1$ represents the mass of the dummy head, and represents the duration of the collision process.

6. The method for predicting the dummy head injury during the automobile collision according to claim 3, wherein the energy lost due to the Hertz contact is calculated according to the following formula:

$$E_H = \frac{2}{5}k_H \cdot \Delta x_H^{\frac{5}{2}} \qquad \text{formula (10)}$$

wherein $E_H$ represents the energy lost due to the Hertz contact, H represents the sum of deformation quantities of the dummy head and the rigid flat plate in Hertz contact in the collision process, and $k_H$ represents Hertz contact stiffness.

7. The method for predicting the dummy head injury during the automobile collision according to claim 3, wherein the energy lost due to the shell body deformation is calculated according to the following formula:

$$E_{sh} = \frac{1}{2}k_{sh} \cdot \Delta x_{sh}^2 \qquad \text{formula (13)}$$

wherein $E_{sh}$ represents the energy lost due to the shell body deformation, $\Delta x_{sh}$ represents a deformation quantity of a bending deformation of the dummy head, and $k_{sh}$ represents contact stiffness of the shell body deformation of the dummy head.

8. The method for predicting the dummy head injury during the automobile collision according to claim 3, wherein the energy lost due to the collision speeds is calculated according to the following formula:

$$E_e = \frac{1-e^2}{2} \cdot \frac{m_1 m_2}{m_1 + m_2}(v_1 - v_2)^2 \qquad \text{formula (15)}$$

wherein $E_e$ represents the energy lost due to the collision speeds, e represents a recovery coefficient, and $m_2$ represents the mass of the rigid flat plate.

* * * * *